United States Patent Office 3,333,704
Patented Aug. 1, 1967

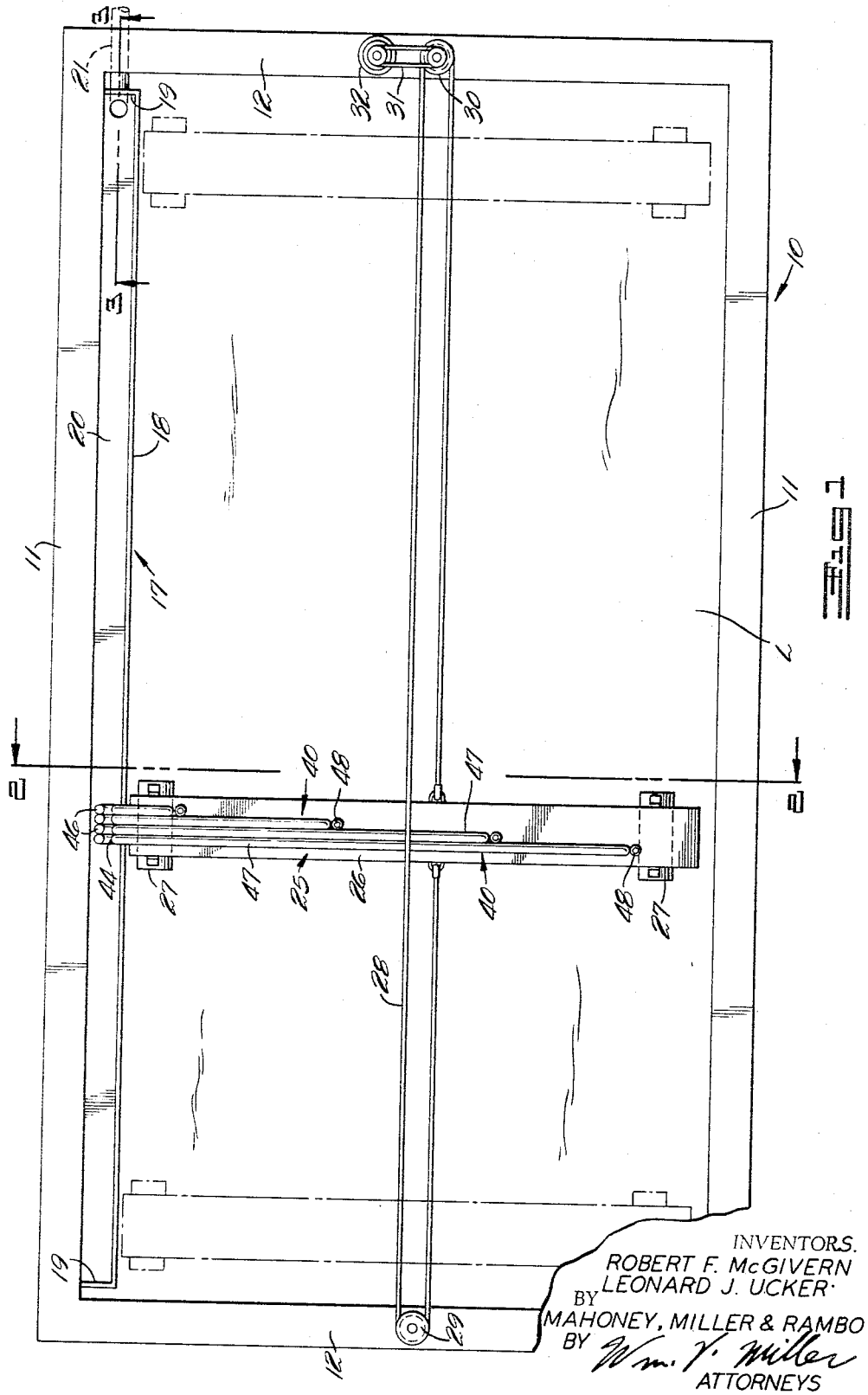

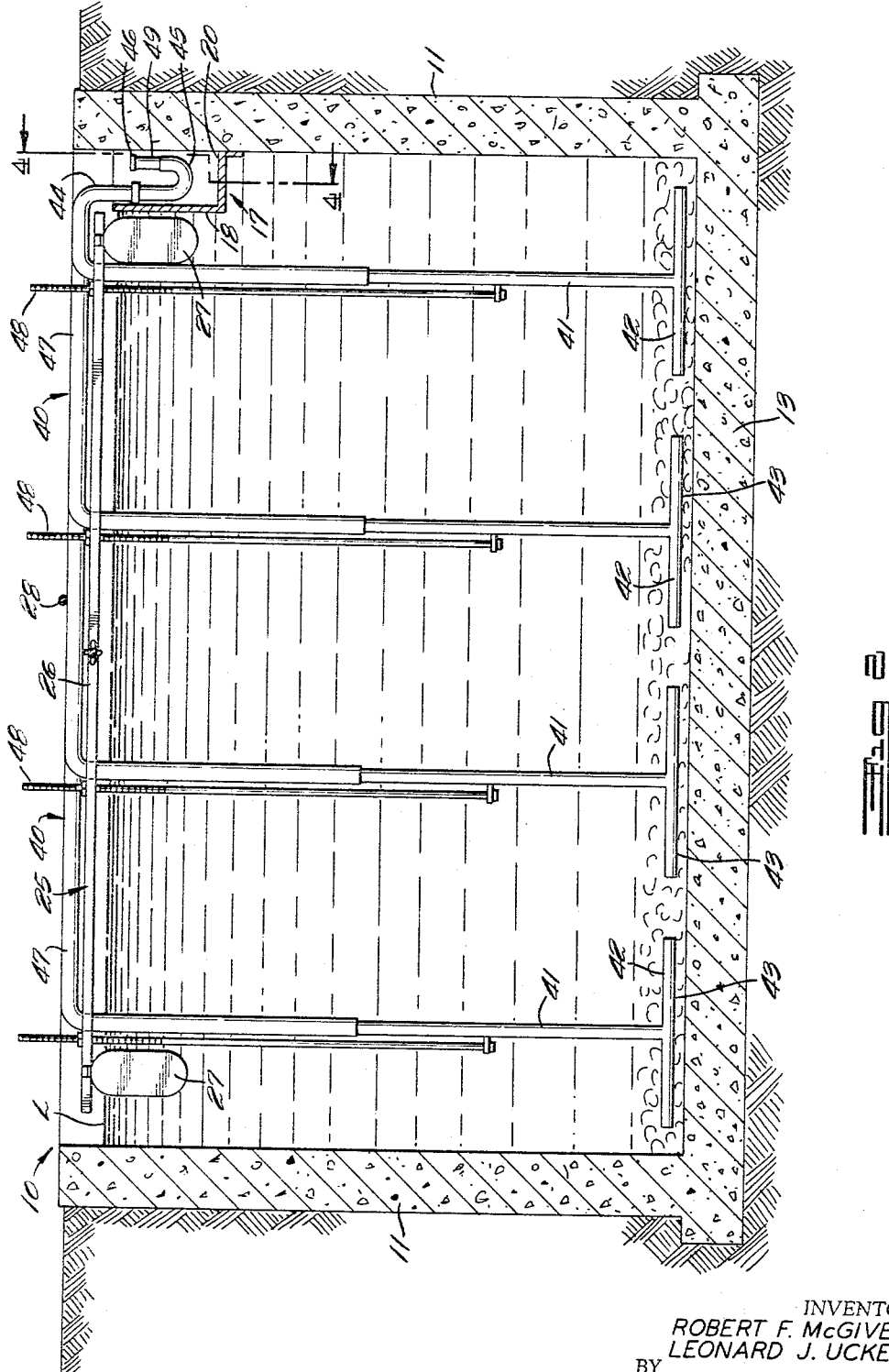

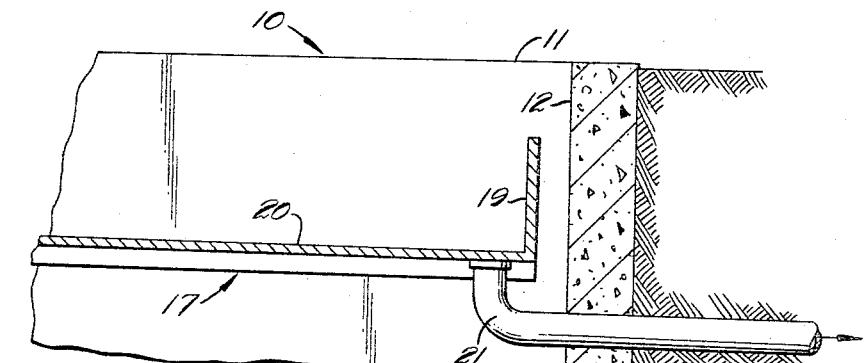
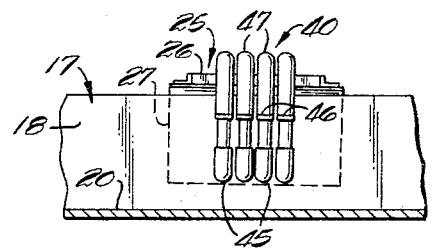
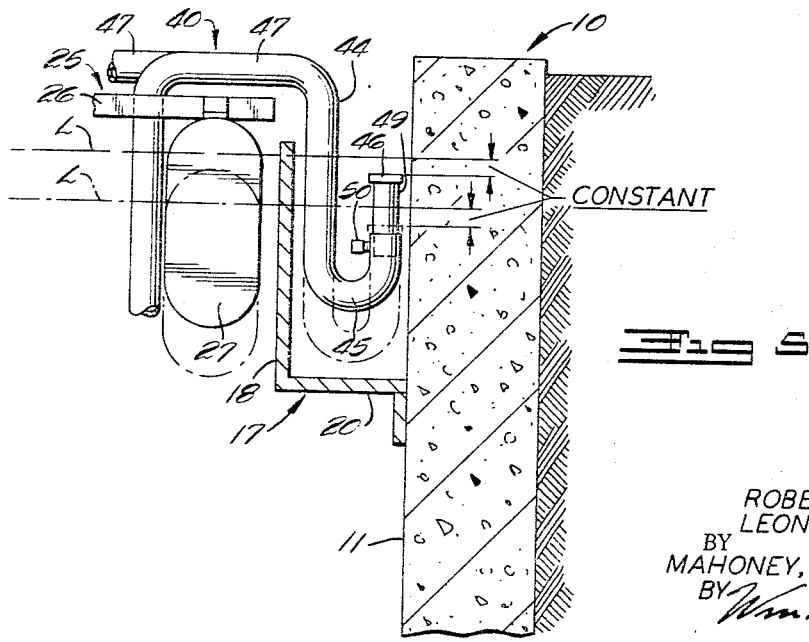

3,333,704
SLUDGE REMOVAL SYSTEM FOR A SEWAGE
SETTLING TANK
Robert F. McGivern, 6400 Plesenton Drive, Worthington, Ohio 43085, and Leonard J. Ucker, 110 E. N. Broadway, Columbus, Ohio 43214
Filed May 24, 1965, Ser. No. 458,032
7 Claims. (Cl. 210—242)

Our invention relates to a sludge removal system for a sewage or water settling tank. It has to do, more particularly, with a siphon method and system associated with a sewage or water settling tank, for example, of the type used in connection with the clarification processes of sewage or water treatment.

The present invention is related to the invention disclosed in the application of Robert F. McGivern, Ser. No. 454,488, filed May 10, 1965, now abandoned. However, the present invention deals with a novel arrangement for supporting the siphon system so that variations in liquid level in the treatment tank will have no effect on the siphon system.

According to the present invention, the siphon or siphons of the system are supported by a carriage which, in turn, is supported by the liquid in the tank by means of floats. Each siphon has an inlet adjacent the bottom of the tank and an outlet which is located in an upper trough or chamber separate from the tank and having a bottom that is at all times below the level of the liquid in the tank. The outlet of each siphon is located in the trough or chamber at a level lower than the level of the liquid in the tank. The distance between the level of the liquid and the lower discharge outlet of the siphon is critical in determining the operation of the siphon. This distance is initially adjusted, upon installation of the system, by adjustment of the level of the outlet relative to the carriage which carries it and, thereafter, remains constant due to the fact that the carriage merely floats up and down in accordance with variations in the level of the liquid without disturbing the position of the siphon outlet relative to the carriage. Thus, variations in liquid level in the tank will have no effect on the operation of the siphon system.

In the accompanying drawings, we have illustrated one siphon arrangement for removing sludge from a settling tank using the system of this present invention but it is to be understood that many other specific arrangements may be provided without departing from basic principles.

In these drawings:

FIGURE 1 is a schematic plan view of a tank equipped with a siphon-type sludge removal system in accordance with our invention.

FIGURE 2 is a transverse vertical sectional view taken along line 2—2 of FIGURE 1.

FIGURE 3 is an enlarged longitudinal vertical fragmentary sectional view taken along line 3—3 of FIGURE 1.

FIGURE 4 is an enlarged transverse vertical fragmentary sectional view taken along line 4—4 of FIGURE 2.

FIGURE 5 is a schematic view illustrating the constant vertical distance between the siphon outlet and the level of the liquid in the tank.

With reference to the drawings, we have illustrated a large, elongated sewage-receiving tank 10 of rectangular cross section. However, it is to be understood that the principles of this invention are not limited to a tank of this shape and that the siphon system disclosed herein may be applied to tanks of various shapes. The tank shown includes the upright vertical side walls 11, the opposed end walls 12, and the bottom 13. Tanks of this type are commonly provided with an inlet (not shown) for raw or other sewage usually at one end and an outlet (not shown) usually at the opposed end through which clarified or partially clarified liquid is discharged. Sometimes, the inlet and outlet are so arranged, as is well known in the art, that variations in the level of the liquid, indicated at L, in the tank can occur from time-to-time. Several of these treatment tanks may be connected in sequence.

A siphon outlet chamber is associated with the tank and is illustrated as being an upwardly opening trough or channel 17 which extends the full length of the tank along one side wall 11 thereof and adjacent the upper edge thereof. This channel may have one of its side walls formed by the adjacent side wall 11 of the tank and the other upright side wall 18 extending longitudinally and parallel to the wall 12 and spaced laterally inwardly thereof. The ends are cosed at 19 and the bottom 20 slopes toward one end so that there will be a gravity flow of sludge, discharged into the tank, toward an outlet line 21 at one end thereof which leads to a suitable discharge point. The bottom 20 is always below the liquid level L of the tank. Other siphon outlet chamber arrangements may be provided as it is only important that the chamber be out of communication with the main part of the tank and it be so formed that it is possible to locate the siphon outlet at a level below the level of the liquid in the tank. In each form, the walls of the chamber will extend upwardly above the level of the liquid in the tank.

As previously indicated, the siphon or siphons are supported on a floating carriage. This carriage is indicated at 25 and is shown as comprising a flat platform 26 which extends transversely substantially the full distance between the inner side wall 18 of the chamber 17 and the opposed side wall 11 of the tank. This platform 26 is carried by a suitable number, shown as a pair, of floats or pontoons 27 attached beneath the opposed ends thereof.

The carriage 25 is adapted to be floated back and forth over the surface L of the liquid in the tank so that it will repeatedly traverse the full length of the tank. It may be moved back and forth by the arrangement shown or some other suitable arrangement. In the arrangement shown, a cable 28 is attached at the front and back edges respectively of the platform 26 and is looped around an idler sheave 29 mounted on the upper edge of one of the end walls 12 and a driven sheave 30 mounted on the upper edge of the other end wall 12. The sheave 30 is driven by a chain drive 31 from a suitable electric motor 32. The motor 32 is preferably of the variable speed, reversible type and may be controlled by a suitable circuit such as that disclosed in said copending application. As will be understood later, it is desired that when the siphon system is used with a tank of the shape shown that the motor controls be capable of moving the carriage along the length of the tank at a varying rate of speed.

One or more siphons and preferably a plurality of siphons are provided, according to our invention, for removing the sludge from the bottom of the tank 10 and each is indicated generally by the numeral 40. All of these siphons are mounted on and are carried by the carriage 25 for movement longitudinally of the tank therewith so as to be moved along the full length of the tank.

Each siphon 40 comprises a depending pipe or tube 41 which is of inverted T-form having the inlet lower branch 42 horizontally disposed and located just above the bottom 13 of the tank. This inlet branch 42 is provided with downwardly opening sludge inlets 43 spaced along its length through which the sludge may be drawn inwardly into the siphon. Each branch 42 of a siphon will extend over only a portion of the width of the tank bottom 13 but the siphons are provided in sufficient number with the branches so arranged that the entire width of the bottom will be covered by the inlet branches of the siphons. Thus, sludge will be removed from the full width of the bottom, and since the carriage is moved from end-to-end of the tank, from the full length of the bottom.

Each siphon 40 also includes a laterally spaced pipe or tube 44 which extends downwardly into the trough 17 and which carries a depending outlet air trap 45 that can move along in the trough 17 as the carriage 25 moves along the tank 10. Each trap 45 is provided with an upwardly directed siphon outlet or discharge, the upper extremity of which is indicated at 46. The pipe sections 47 of the various siphons are of varying lengths to locate the depending inlet pipes 41 in proper lateral positions relative to the bottom 13 of the tank 10.

Each pipe section 41 preferably has an adjustment, such as a telescopic adjustment, whereby the level of the horizontal inlet branch 42 may be adjusted relative to the tank bottom 13. This adjustment may be accomplished by means of a screw 48 which extends upwardly through the platform 26 so that it is readily accessible above the level L of the liquid in the tank.

The level of the discharge outlet 46 of each siphon 40 is important and critical and must always be below the level L of the liquid in the tank. Therefore, an adjustment is provided for initially setting the level of this outlet 46 accurately. This adjustment may take the form shown or may be accomplished in other ways. As shown, it comprises an upwardly directed discharge or weir section 49 (FIGURE 5) which telescopes with the upwardly directed arm of the trap. It is held in adjusted position by means of a setscrew 50.

With this arrangement, the sludge is removed from the bottom 13 of the tank as it accumulates thereon by means of a siphon action. Each siphon 40 may be started in a suitable manner such as by applying vacuum at the outlet or discharge end thereof. The siphons 40 are moved along with the carriage 25 from the inlet end of the tank toward the outlet end thereof with varying speed. This speed is selected in accordance with the rate of deposit of the sludge on the bottom 13 of the tank and which, in accordance with Stokes' law, will vary with the rate of flow of the sewage away from the inlet and the specific gravity of the solids carried thereby. Usually, the tank will be so designed that the greatest deposit will be at approximately the mid point of the length of the tank, assuming it is a rectangular tank, and, consequently, the speed of the motor 32 will be controlled to cause the carriage 25 to gradually pick up speed as it moves away from the inlet end of the tank until it reaches the mid point thereof and then to gradually decrease in speed and to reverse in a similar manner. The vertical position of the bottom 20 of the trough 17 relative to the normal liquid level L will be selected in accordance with the nature of the raw sewage being treated. For example, if the solids in the sludge are of relatively high specific gravity, it is desirable to have the bottom 20 relatively low and the siphon discharge end 46 relatively low so that a higher velocity flow through the siphon will result and the higher flow will result in more effective removal of the high specific gravity materials. Conversely, if the sludge material is of low specific gravity, a lower velocity flow will be sufficient to remove the sludge materials and, therefore, the bottom 20 of the trough can be at a higher level. For example, if the sludge has a high grit content, it may be desirable to have the bottom 20 at a level corresponding to about one-half to one-quarter the depth of the liquid therein to maintain a high velocity flow through the siphons to remove effectively the high specific gravity grit. The siphon inlet branches 43 will move along the bottom 13 and will cover the entire width of the bottom and this movement longitudinally will be at a varying speed in accordance with the varying amount of deposit of solids along the bottom. The sludge, which is semi-liquid, will be drawn up through the inlet openings 43 by each siphon 40 and be discharged from the siphon outlet 46 as it moves along the trough 17. Breaking of the siphon by air entering through the outlet 46 will be prevented by the air trap 45. The sludge discharged into the trough 17 will flow towards the discharge or outlet 21 thereof. The effect of each siphon can be varied by changing the speed of movement of the carriage 25 and by varying the level of the siphon outlet 46 relative to the liquid level L. Some variation can be brought about by varying the level of the inlet branches 42. However, the critical distance is that from the level of the discharge 46 up to the level of the liquid L. When this is once set, it will remain constant, as indicated in FIGURE 5, regardless of the variations in the liquid level L. This is due to the fact that the carriage 25 is carried on floats so that the carriage will move vertically in accordance with the variation in the level of liquid in the main tank as determined by its outlet, but since the siphon discharge outlet 46 is fixed vertically relative to the carriage, there will be no variation in the level of it relative to the liquid level L.

It will be apparent that this invention provides a simple and inexpensive system for removing settling or sludge from the bottom of a settling tank preferably by means of a siphon action which is not affected by variations in liquid level.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described our invention, what we claim is:

1. A sewage or water settling tank having an upright side wall arrangement and a bottom, inlet and outlet means arranged to permit settling of sludge on the bottom from liquid in the tank and arranged to permit variations in the liquid level in the tank, said tank being provided with a chamber independent of the tank having a bottom which is below the level of the outlet means and the level of the liquid in the tank determined thereby, and a siphon for removing the sludge from the bottom of the tank and comprising a conduit having an inlet adjacent the bottom of the tank and an outlet in said chamber at a selected level below the level of said tank outlet means and the liquid level determined thereby, means for supporting said siphon comprising a carriage which floats on the liquid in the tank so as to maintain constant the vertical distance relationship between the level of the siphon conduit outlet and the level of the liquid in the tank regardless of variations in the liquid level in the tank, and means for moving said floating carriage along the surface of the liquid in the tank so that the siphon inlet moves along the bottom of the tank to remove the sludge deposit along the tank bottom and substantially without disturbing said vertical distance relationship between said liquid level and said siphon outlet level in said chamber.

2. The combination of claim 1 in which said chamber is in the form of a channel extending across the tank, said channel having a bottom which inclines toward an outlet so that there will be gravity flow of the sludge from the channel.

3. The combination of claim 2 in which a plurality of said siphon conduits are provided with their inlets located at laterally spaced positions along the bottom of the tank, all of said siphons being supported by said carriage for movement across the tank with their inlets moving along the bottom of the tank and with their outlets movable through said channel.

4. The combination of claim 3 in which each siphon conduit is provided with means for adjusting the level of its inlet.

5. The combination of claim 4 including an air trap on each siphon having an upwardly directed outlet, and means for vertically adjusting the siphon outlet to different levels.

6. The combination of claim 5 in which said tank has an inlet end and an outlet end with the channel extending between these ends and with the carriage movable by said moving means back and forth between said ends, said carriage moving means moving it from the inlet end to the outlet end of the tank at a variable speed in accordance with the variation in amount of deposits of sludge along the bottom of the tank.

7. A sewage or water settling tank having an upright side wall arrangement and a bottom forming a settling chamber, inlet and outlet means arranged to permit settling of sludge on the bottom from liquid in the chamber and arranged to permit variations in the liquid level in the chamber, and a siphon for removing the sludge from the bottom of the chamber and comprising a conduit having an inlet adjacent the bottom of the chamber and an outlet disposed outside the chamber at a selected level below the level of said chamber outlet means and the liquid level determined thereby, means for supporting said siphon comprising a support which floats on the liquid in the chamber so as to maintain constant the vertical distance relationship between the level of the siphon conduit outlet and the level of the liquid in the settling chamber regardless of variations in the liquid level in the chamber so as to remove the sludge deposit on the chamber bottom without disturbing said vertical distance relationship between said liquid level and said siphon outlet level.

References Cited

UNITED STATES PATENTS

| | | | |
|---|---|---|---|
| 196,997 | 11/1877 | Steitz et al. | 137—152 X |
| 698,265 | 4/1902 | Didelon | 137—152 X |
| 892,382 | 6/1908 | Omond | 137—152 X |
| 900,470 | 10/1908 | Beeson | 285—302 |
| 982,734 | 1/1911 | Martinelli | 137—140 |
| 1,912,595 | 6/1933 | Schlenz | 210—197 X |
| 2,101,079 | 12/1937 | Lund | 210—527 X |
| 2,159,409 | 5/1939 | Tark | 210—527 |
| 2,168,264 | 8/1939 | Marshall | 210—527 |
| 2,805,775 | 9/1957 | Brock | 137—140 X |
| 2,866,557 | 12/1958 | Easterday | 210—527 |
| 3,087,710 | 4/1963 | Dujardin | 210—525 X |
| 3,235,083 | 2/1966 | Sontheimer et al. | 210—527 X |

FOREIGN PATENTS

| | | |
|---|---|---|
| 235,872 | 1/1926 | Great Britain. |
| 390,989 | 4/1933 | Great Britain. |

SAMIH N. ZAHARNA, *Primary Examiner.*

REUBEN FRIEDMAN, *Examiner.*

J. L. DeCESARE, *Assistant Examiner.*